Dec. 6, 1960 J. S. HOEKSTRA ET AL 2,962,774
DEVICE FOR THE MANUFACTURE OF SHELLS FOR
THE SHELL MOULDING METHOD
Filed June 24, 1957

Inventors
Jacob S. Hoekstra
Hennens J. M. Verschure
by Stevens, Davis, Miller & Mosher
their attorneys

United States Patent Office 2,962,774
Patented Dec. 6, 1960

2,962,774

DEVICE FOR THE MANUFACTURE OF SHELLS FOR THE SHELL MOULDING METHOD

Jacob S. Hoekstra, Van 't Haaffstraat 30, Noordwijkerhout, and Henricus J. M. Verschure, Cliostraat 46II, Amsterdam, Netherlands Filed June 24, 1957, Ser. No. 667,512

Claims priority, application Netherlands July 10, 1956

4 Claims. (Cl. 22—33)

This invention relates to a device for the manufacture of shells for the shell moulding method, the device comprising a container open at the top for receiving an amount of moulding material and a moulding plate adapted to close the container opening, a driving shaft being provided which has been coupled to the driving means for the moulding plate, the arrangement being such that the moulding plate first moves towards the container and that thereafter the container with the moulding plate are inverted, whereupon both are moved back again into their initial position. The invention aims at providing a device of this type permitting of a quick operation and being of simple design.

This is achieved with the device according to the invention in that the container has been arranged in a frame which is carried by the driving shaft in a freely rotatable manner, the moulding plate being rotatably mounted in the said frame. Consequently, the moulding plate and the container rotate in the same direction.

In order to keep the inertia resistance as low as possible the container may, according to the invention, be arranged between the driving shaft and the moulding plate.

A preferred embodiment of the device according to the invention is characterized in that the moulding plate comprises a projection co-operating with an abutment provided on the frame of the device. This arrangement enables the container to be driven already before it has been closed by the moulding plate. Immediately after the projection of the moulding plate has reached the abutment, the moulding plate and the container start moving in the same direction, the container overtaking the moulding plate. As a result of this arrangement the container settles itself against the moulding plate without a shock, so that the container opening is closed. The said abutment may be made adjustable. It is preferred according to the invention to make this abutment elastically yieldable, so that it acts as a buffer for the projection of the moulding plate.

In order to keep the moulding plate in the position in which it closes the container opening the moulding plate may, according to the invention, be provided for part of its path with locking rollers co-operating with guides provided in the frame.

A preferred embodiment of the device according to the invention is characterized in that the driving shaft is provided with sprockets or similar transmission means fixedly mounted thereon which are coupled with sprockets or similar means of the moulding plate, these last-mentioned sprockets or similar means being of larger diameter than the first-mentioned ones. Hence the angular velocity of the closed container exceeds that of the open container and of the moulding plate when the latter is not in the position closing the container.

The invention will be elucidated below with reference to the accompanying drawings showing diagrammatically by way of example an embodiment of the device according to the invention in three different positions.

Figure 1:
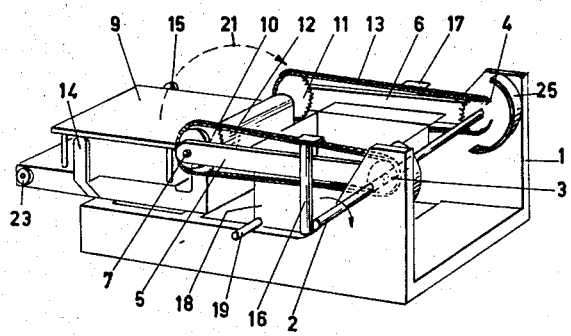
Fig. 1 shows the device in the initial position.
Figure 2:
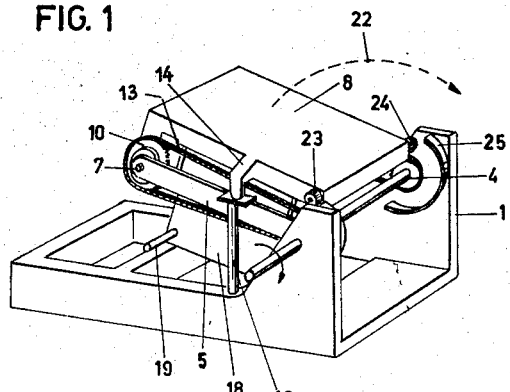
Fig. 2 shows the device in the position in which the moulding plate has closed the container.

The device shown in the drawings comprises a frame 1 through which a driving shaft 2 passes which may be driven in a manner not shown, for example by means of an electromotor. On this driving shaft two sprockets 3 and 4 have been fixedly mounted. The shaft 2 carries a frame formed by two brackets 5 and 6 in which a shaft 7 is freely rotatable, the latter shaft carrying a moulding plate holder 8 on which a moulding plate 9 has been arranged. On the shaft 7 two sprockets 10, 11 have been fixedly mounted. Around the sprockets 3, 4 and 10, 11 chains 12, 13 have been laid.

The moulding plate holder 8 is provided with two projections 14, 15 co-operating with abutments 16, 17 arranged on the frame 1. These abutments may be constructed elastically in such a way that they are yieldable to a certain extent. To this end they may be equipped with rubber pads or springs or they may be constructed according to the pneumatic, hydraulic or some other principle. If required, they may be adjustable.

The moulding plate 9 has been constructed so as to be adapted to close a container 18 open at the top and arranged between the brackets 5 and 6 in which container an amount of material for the manufacture of shells may be introduced. The container 18 is provided with two projections 19, 20 co-operating with the frame 1 and carrying the container in the position shown in Fig. 1.

Figure 3:
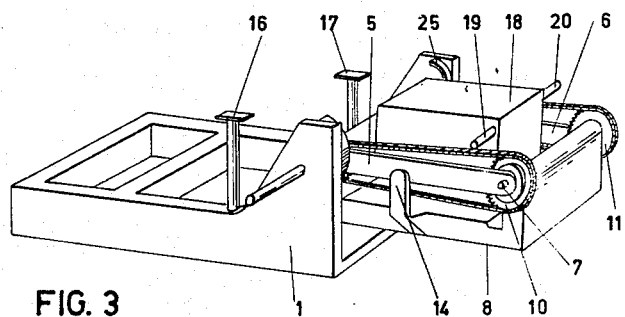
Fig. 3 shows the device in the position in which the container has been inverted.

The device described above operates as follows:

When the driving shaft 2 is driven, the sprockets 3 and 4 mounted thereon drive the sprockets 10 and 11 which are fixedly mounted on the shaft 7. On this shaft the moulding plate holder 8 is secured so that this moulding plate holder is rotated in the direction of the arrow 21 towards the container 18 until the abutments 14 and 15 of the moulding plate holder 8 come into contact with the abutments 16 and 17 provided on the frame 1. Since the moulding plate holder is unable to move farther, the brackets 5 and 6 start rotating in the direction of the arrow 22 and during this rotation the container 18 is taken along and the moulding plate 9 is overtaken by the container so that the container opening is closed. On the moulding plate holder 8 two locking rollers 23 and 24 are provided which co-operate with the guides 25 arranged in the frame 1. As a result the moulding plate holder 8 is guided in such a manner as to prevent the moulding plate 9 from leaving the container 18. The driving shaft 2 is driven until the container 18 closed by the moulding plate 9 assumes the position shown in Fig. 3. The device remains in this position for such a period of time as is necessary to heat the shell moulding material brought onto the moulding plate 9 by the inversion of the container 18. Thereafter the container 18 and the moulding plate 9 rotate back into the position shown in Fig. 1.

It is obvious that the invention is not restricted to the device described above by way of example and shown in the accompanying drawings but that it is possible to modify the device in many ways without departing from the scope of the invention.

We claim:

1. A device for the manufacture of shells destined for the shell molding process, said device comprising a stationary first frame, a driving shaft rotatably mounted in the first frame, a movable second frame having opposing ends and mounted for free rotation at one of its ends on said driving shaft, a second shaft rotatably supported in said second frame at the other end thereof and disposed parallel with the driving shaft, a pattern plate carrier for carrying a pattern plate fixedly secured at one end on said second shaft, transmission means secured to said shafts and coupling them together for rotation, a container having an open top carried by the second frame and being arranged between said shafts, so that by rotating the driving shaft the pattern plate may first be swung from its initial position at one side of the second shaft to the other side of said second shaft to close the container and to move thereafter together with said container until said container is inversed whereupon the container and the pattern plate are returned to their initial positions, said pattern plate comprising at least one projection co-operating with an abutment provided on the first frame and projecting on a level above the second frame in such a way that said projection engages said abutment before the pattern plate closes the container and the pattern plate and the container begin their common rotation before the container is completely closed.

2. A device for the manufacture of shells destined for the shell molding process, said device comprising a stationary first frame, a driving shaft rotatably mounted in the first frame, a movable second frame having opposing ends and mounted for free rotation at one of its ends on said driving shaft, a second shaft rotatably supported in said second frame at the other end thereof and disposed parallel with the driving shaft, a pattern plate carrier for carrying a pattern plate fixedly secured at one end on said second shaft, transmission means secured to said shafts and coupling them together for rotation, a container having an open top carried by the second frame and being arranged between said shafts, so that by rotating the driving shaft the pattern pltae may first be swung from its initial position at one side of the second shaft to the other side of said second shaft to close the container and to move thereafter together with said container until said container is inversed whereupon the container and the pattern plate are returned to their initial positions, said pattern plate comprising at least one projection co-operating with an abutment provided on the first frame and projecting on a level above the second frame in such a way that said projection engages said abutment before the pattern plate closes the container and the pattern plate and the container begin their common rotation before the container is completely closed, said projection being adjustable.

3. A device for the manufacture of shells destined for the shell molding process, said device comprising a stationary first frame, a driving shaft rotatably mounted in the first frame, a movable second frame having opposing ends and mounted for free rotation at one of its ends on said driving shaft, a second shaft rotatably supported in said second frame at the other end thereof and disposed parallel with the driving shaft, a pattern plate carrier for carrying a pattern plate fixedly secured at one end on said second shaft, transmission means secured to said shafts and coupling them together for rotation, a container having an open top carried by the second frame and being arranged between said shafts, so that by rotating the driving shaft the pattern plate may first be swung from its initial position at one side of the second shaft to the other side of said second shaft to close the container and to move thereafter together with said container until said container is inversed whereupon the container and the pattern plate are returned to their initial positions, said pattern plate comprising at least one projection co-operating with an abutment provided on the first frame and projecting on a level above the second frame in such a way that said projection engages said abutment before the pattern plate closes the container and the pattern plate and the container begin their common rotation before the container is completely closed, the abutment co-operating with said adjustable projection being elastically yieldable.

4. A device for the manufacture of shells destined for the shell molding process, said device comprising a stationary first frame, a driving shaft rotatably mounted in the first frame, a movable second frame having opposing ends and mounted for free rotation at one of its ends on said driving shaft, a second shaft rotatably supported in said second frame at the other end thereof and disposed paralell with the driving shaft, a pattern plate carrier for carrying a pattern plate fixedly secured at one end on said second shaft, transmission means secured to said shafts and coupling them together for rotation, a container having an open top carried by the second frame and being arranged between said shafts, so that by rotating the driving shaft the pattern plate may first be swung from its initial position at one side of the second shaft to the other side of said second shaft to close the container and to move thereafter together with said container until said container is inversed whereupon the container and the pattern plate are returned to their initial positions, said pattern plate comprising at least one projection co-operating with an abutment provided on the first frame and projecting on a level above the second frame in such a way that said projection engages said abutment before the pattern plate closes the container and the pattern plate and container begin their common rotation before the container is completely closed, the pattern plate carrier being provided with locking rollers arranged at the end of the pattern plate carrier opposite the end in which the second shaft, carrying said pattern plate carrier, is arranged, curved guides being so arranged in the first frame near the driving shaft that said locking rollers co-operate with said curved guides for keeping the pattern plate against the opening of the container when said container moves towards and away from the inversed position.

References Cited in the file of this patent

UNITED STATES PATENTS

| 2,765,505 | Sylvester | Oct. 9, 1956 |
| 2,798,265 | Rubovitz | July 9, 1957 |
| 2,804,661 | Hutchinson | Sept. 3, 1957 |

FOREIGN PATENTS

| 166,291 | Australia | Dec. 9, 1955 |